Oct. 4, 1966 A. HUNTER 3,276,774

CARD ADVANCING MECHANISM FOR SERIAL PUNCH

Filed May 19, 1964 2 Sheets-Sheet 1

INVENTOR
ALEXANDER HUNTER

BY David Leschine

ATTORNEY

United States Patent Office 3,276,774
Patented Oct. 4, 1966

3,276,774
CARD ADVANCING MECHANISM FOR SERIAL PUNCH

Alexander Hunter, Chalfont, Pa., assignor to Sperry Rand Corporation, New York, N.Y., a corporation of Delaware Filed May 19, 1964, Ser. No. 368,534
5 Claims. (Cl. 271—54)

This invention pertains to record card advancing mechanisms for serial punching devices and more particularly to a device for accurately advancing a record card through a punching device in incremental steps.

A record card, commonly known as a punched card, offers a convenient method for providing input information and receiving the output information of modern computing devices and data processing systems. The record cards most generally employed are oblong, being 7⅜ inches in length and 3¼ inches in width. Provision is made in the cards, for example, for 80 columns along the length of the card and for 12 rows along the width of the card giving a maximum of 960 possible positions for punching. Record cards may be punched by a method known as gang punching wherein any or all of the 960 positions may be punched at a single time. Record cards may also be punched in a serial manner, which would present to the punching station all the columns of a single row, (e.g., 80 columns of any row at a single time) or present all of the row positions of a single column (e.g., 12 row positions). Variations in these two serial modes include the punching of two, four, or any convenient number of columns in a single operation. This shortens the number of cycles required to completely punch the record card in the desired positions. Due to the large mount of information which may be placed upon the record card, as it moves through the punching device, it is imperative that the position of the punch apertures in the record card be held to within close tolerances. The punch aperture locations generally employed require 0.087 inch from center to center of adjacent punch apertures with a tolerance of ±0.007 inch. Record card reading equipment can correctly read punch apertures which occur within the range of 0.080 to 0.094 inch, but will produce errors if the punch aperture spacing exceeds this range. Information contained by punch apertures outside of the desired range is effectively lost.

One of the principal reasons for the incorrect location of punch apertures is the incorrect location of the record card with respect to the punch mechanism. The location errors may be due to an incorrect initial placement of record card with respect to the punch mechanism or due to errors in the advancement of the record card through the punch mechanism. The first type of error is usually a single initial error whereas the latter may accumulate as the record card is advanced through the punch mechanism. It is thus essential that the record card be correctly placed with respect to the punch mechanism initially and be fed through the punching device at accurately held incremental steps to insure that the punch location is as close to the desired location and spacing as can be achieved.

In relatively slow speed devices, that is in devices capable of handling record cards at a rate of less than 50 record cards per minute, sufficient time is available to permit the record card to be accurately stopped and positioned prior to the punch operation. However, in modern high speed record card punching devices which punch record cards at rates in excess of 75 record cards per minute, such time is not available and positioning must be accurate despite the short time periods available. Within very short periods of time, the record card must be accurately advanced from its former position to its new position and stopped, in order that the punch bar going through the record card will find the record card at rest. If the record card is still in motion at the time the punch bar attempts to go through the record card, a jagged, irregular edge punch aperture will result, which may cause this aperture to be erroneously read in later reading operations of the record card. Additionally, the movement of the punch through a moving record card may cause the record card to be torn and jam the punch device.

In many devices employed in the prior art, the record card is initially placed at a forward or rear stop to give an accurate initial record card location and then the record card is moved by a set of accurately held feed rolls through the punch position, a column or as many as four columns at a time. Variations in the thickness of the record card, changes in the diameters of the feed rolls, the presence of dirt, wear, moisture and other factors, change the relative ability of the feed rolls to advance record cards accurately through the punch station. Errors in advancing the record card due to record card or roll conditions are cumulative and thus result in greater position errors as the latter portion of the record card is presented for punching.

An approach, which tends to overcome cumulative errors, employs accurately positioned stops at each one of the respective punch positions. These stops contact the forward edge of the record card as it is moved through the punch mechanism stopping the record card at desired locations. The stop is then removed, and a stop further along the line of travel of the record card is placed in the card path, and the record card advanced to contact the stop. Such a technique is relatively slow and expensive, requiring a number of accurately placed and accurately controlled stop mechanisms. This technique, however, offers a series of correct stops preventing the build-up of cumulative types of errors created by slippage or erroneous contact of the feed rolls as was found in the prior art. Additionally, the positive stop assures correct initial location.

Photo cell devices for accurately positioning the cards have also been employed. These devices are expensive, for they require a great number of photo cells, many circuits, and many accurate stop devices in order to control the accurate movement of the card through the punch device.

A further device of the prior art employs flexible spring members placed at the rear of a record card, and which spring members are selectively and sequentially brought into contact with the rear of the record card to cause the advancement thereof, one record card position at a time. The device advances a record card along its long dimension so as to present all 80 columns of a single row at a time. The first spring member will contact the record card and advance it to present the row commonly known as 12 to the punch bars. This spring member will be moved out of contact with the record card and followed by the contact of a further spring member which will advance the record card during its next cycle to the row designated 11. This will continue until all 12 rows have been presented to the punch bars. This technique however suffers from the disadvantages that should there be any dirt, wear of the spring members, or changes in the spring member tensions, it is possible to miss the record card and fail to move it to the required row position or scrub the surface of the record card with sufficient pressure to damage the record card.

The present invention overcomes the defects of the prior art devices by providing a record card advancing device capable of moving a record card through more precise distances and more accurately placing the desired record card positions at an associated punch device than is possible in prior art devices. The device employs a sawtooth plate, the teeth of which are accurately machined with respect to one another. A spring plate with one spring corresponding to each of the spaces between the adjacent teeth is positioned over the sawtooth plate to move therewith. A record card to be advanced is placed between the spring plate and the sawtooth plate and the trailing edge of the record card is forced to engage the leading edge of one of the teeth by means of the associated spring of the spring plate. The entire assembly including sawtooth plate, the spring plate and the card is then moved in the direction of the punch device, a distance sufficient to precisely place the desired record columns in the punch station. A restraining or drag means is then applied to the record card to permit relative motion between the record card and the sawtooth plate-spring plate assembly, so that as the sawtooth plate-spring plate assembly returns to its initial position, the record card is left at the position to which it had been moved. Sufficient return motion of the sawtooth plate-spring plate assembly is assured so that the trailing edge of the record card now abutts the next adjacent tooth in the direction of the punch to that which was abutted in the past operation. Now upon movement of the assembly with the record card, the record card will be moved so that the next record card positions to be punched will enter the punch area. Again actuation of the restraining means will permit relative motion of the record card with respect to the sawtooth plate-spring plate assembly as the assembly is returned to its initial position. In this manner, by permitting the trailing edge of the record card to engage each of the teeth of the sawtooth plate successively and in a direction toward the desired motion of the record card, the record card may be accurately advanced through the punch station. The distance of motion is controlled by the spacing of the teeth and by the amount of motion which the sawtooth plate-spring plate assembly is permitted in each of its two respective directions. Therefore, it is an object of this invention to provide an improved form of card advancing mechanism for a serial punch device.

It is still another object of this invention to provide an improved form of high speed card advancing mechanism for a serial punch device.

It is yet another object of this invention to provide an improved form of card advance mechanism for a serial punch device in which the incremental advances of the record card may be accurately controlled, and in which cumulative positioning errors are substantially eliminated.

It is yet still another object of this invention to provide an improved form of card advancing mechanism which is capable of operating at high speed and capable of accurately positioning a record card with respect to a punch station and which substantially eliminates cumulative positioning errors.

Further objects and features of the invention will be pointed out in the following description and claims, and illustrated in the accompanying drawings, which disclose, by way of example, the principles of the invention and the best mode which has been contemplated for carrying it out.

In the drawings.

Similar elements are given similar reference characters in each of the respective figures.

Figure 4:
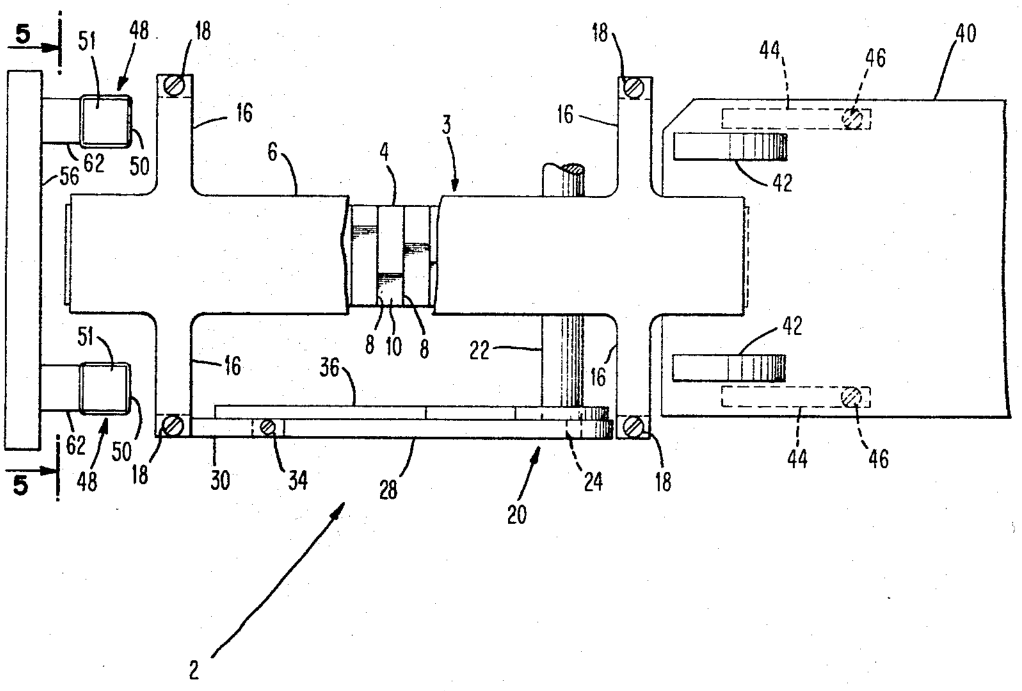
FIGURE 4 is a plan view of the card advancing mechanism illustrating the entry of a record card into the card advancing mechanism.

Turning now to FIGURE 4, there is illustrated a plan view of the card advancing mechanism 2 of the present invention, including its associated punching equipment and illustrating the relative position of a record card 40 as it enters the card advancing mechanism 2. The card advancing mechanism 2, to be described in detail with reference to FIGURE 1, below is approximately one third of the width of a record card, such as the record card 40, and engages the central portion of the record card 40 along its width. The record card 40 is fed into the card advancing mechanism 2 by means of pairs of feed rolls 42, which contact the record card 40 near its edges. The rolls 42 are driven by suitable means (not shown). Although only a single roll 42 is shown atop each edge of the record card 40, it should be understood that a corresponding feed roll 42 exists below each of the shown rolls and below the record card 40. The two rolls 42 of each pair are closely spaced so that they may contact and advance a record card passed therebetween. As the record card 40 is moved into the card advancing mechanism 2, the record card 40 contacts and displaces from its position a pair of flexible spring members 44 in the record card path. As long as the record card 40 continues to pass over the flexible spring members 44, they will be held out of the record card path. The spring members, as can be seen in FIGURE 2, have a hook shape, which when not depressed will block the card passage and prevent the record card 40 from being accidentally moved out of the card advancing mechanism 2 as it reciprocates.

Figure 1:
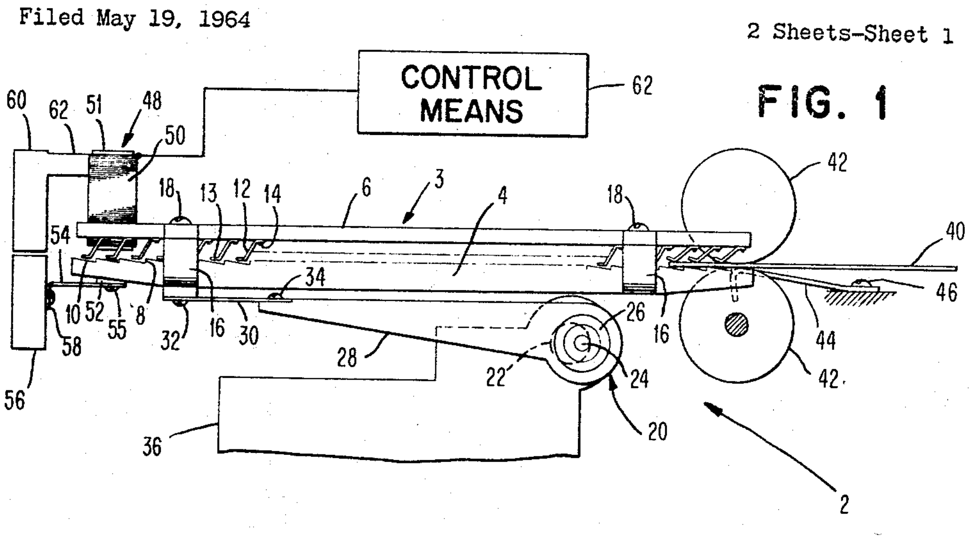
FIGURE 1 is a side view of the card advancing mechanism of a serial punch device.
Figure 2:
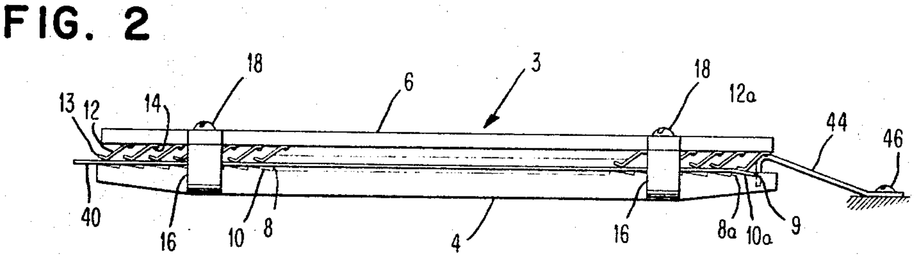
FIGURE 2 is a simplified illustration of the card advance mechanism of FIGURE 1, and illustrating the record card in its initial position inside of the card advancing mechanism.

Referring now to FIGURE 1, the details of the card advancing mechanism 2 will now be set forth. The card advancing mechanism 2 consists of a sawtooth plate-spring plate assembly 3 which is composed of a sawtooth plate 4 and a spring plate 6. The sawtooth plate 4 has a plurality of teeth 8, each tooth having a vertical leading edge and a sloped trailing edge 10. Spring plate 6 has a plurality of spring members 12 affixed to it by means of fasteners 14. The positioning of each of the spring members 12 and the shape of the spring members 12 is such that they provide a flat edge 13 adjacent to the sloped trailing edge 10 of the teeth 8 of the sawtooth plate 4. Sawtooth plate 4 and the spring plate 6 are journaled together by means of support members 16 which are integral parts of the bed plate 4 and to which the spring plate 6 is secured by means of the fasteners 18. In this manner, the position of the individual spring members 12 are fixed with respect to the sloping trailing edges 10 of the teeth 8 of the sawtooth plate 4.

The assembly 3 is arranged for continuous movement in two opposite directions, one to the left and the other to the right of the figure. Such movement is accomplished by means of an eccentric assembly 20 composed of a shaft 22 driven by motor (not shown). Attached to the shaft 22 is an eccentrically mounted pin 24 which in turn is connected within an enclosed bearing housing 26. Attached to the outside of the enclosed bearing housing 26 is a finger 28 which in turn is connected by means of a flexible spring 30 to an extension of one of the members 16 by means of the fastener 32. Flexible member 30 is connected to the finger 28 by means of a fastener 34. The entire shaft 22 is supported by means of a bearing block 36. By means of this eccentric assembly 20, the circular motion of the shaft 22 is translated into lateral movement from left to right and right to left of the sawtooth plate-spring plate assembly 3.

The operation of the card advancing mechanism 2 will now be described with reference to FIGS. 1, 2, 3 and 5. It should be noted at this time that the sawtooth plate-spring plate assembly 3 is continuously being reciprocated in its first and second opposite directions by the eccentric assembly 20, that is the assembly 3 is being moved alternately to the left and right with respect to the figures. Further, the feed rolls 42 are being constantly rotated and the card restraining means 48, to be described below, is inactive and does not interfere with record card motion. The operation can be briefly summarized in the following manner. The record card 40 is fed by the feed rolls 48 into the reciprocating sawtooth plate-spring plate assembly 3. After the record card 40 has completely entered the assembly 3, the record card is prevented from backing out of the assembly and the feed rolls 42, although still rotating no longer affect the record card 40 in the assembly 3. The trailing edge of the record card 40 is caused to engage one of the teeth of the sawtooth plate and the record card 40 is moved toward the punch station 57, to be described in greater detail below, as the assembly 3 moves towards the left. When the maximum left position of the assembly is reached and in the dwell period before motion to the right begins, the record card is punched and the restraining means 48 operated. When the assembly 3 moves to the right, it moves without the card whose movement is prevented by the restraining means 48, and causes the positioning of the trailing edge of the record card 40 adjacent the next tooth of the sawtooth plate 4 in the direction of desired record card movement. Prior to the start of the next leftward movement of the assembly 3, the restraining means 48 is released to prevent its interference wtih further record card movement with said assembly 3.

As was described above with reference to FIGURE 4, record cards, illustrated by the record card 40, are initially fed into the sawtooth plate-spring plate assembly 3 of the card advancing mechanism 2 by means of a set of feed rolls 42. As the record card is advanced through the assembly 3, it passes over spring members 44 which are attached to the bed of the machine by means of a fastener 46. The tension of the spring members 44 are so chosen that the movement of a card over them will cause their depression, and prevent their interference with the advancement of the card.

The record card 40 will be fed between the sawtooth plate 4 and the spring plate 6 by the feed rolls 42 and will not be affected by the continuous reciprocal motion of the card advancing mechanism 2. This is due to the record card 40 being supported by the tops of the teeth 8 of the sawtooth plate 4 and the drive force imparted by feed rolls 42 being in excess of the drag created by the spring members 12. The spring members 12 are not strong enough to overcome the inherent stiffness of the record card 40 nor the support effects of the tops of the teeth 8 and force the record card into contact with the leading edges of any of the teeth 8. Such record card advancing will continue until the record card 40 has completely entered the assembly 3 and the feed rolls 42 no longer affect the card movement. Further, the record having completely entered assembly 3 has also completed its movement over the flexible spring members 44 permitting them to now extend into the record card path, and thus prevent the record card from being accidently discharged from the card advancing mechanism 2 due to the effects of the constant movement of the assembly 3. It should be understood at this time that the relative positioning of the record card 40 with respect to the sawtooth plate-spring plate assembly 3, and more particularly with respect to the teeth of the sawtooth plate 4 at the initial positioning of the record card is intentionally made imperfect, to permit great latitude in the card placement. The affects of any inaccuracy in the card positioning will be automatically corrected by the motion of the assembly 3. On the first movement of the card advancing mechanism 2 to the right, after the record card 40 had completely entered the assembly 3, the trailing edge of the record card 40 will contact the hook ends of the flexible spring members 44 whose positions are fixed with relation to the edge 9 of the sawtooth plate 4 and be restrained from further movement to the right, despite the continued movement to the right of the card advancing mechanism 2. The card advancing mechanism 2, it should be recalled is placed between the flexible spring members 44 and does not interfere with their operation. The card advancing mechanism 2 continues to move to the right a distance sufficient to place the trailing edge of the record card 40 over the sloping trailing edge **10*a* (FIG. 2) of the first tooth 8*a* of the sawtooth plate 4. This is the first type of correction automatically made by the device to compensate for positioning errors within the card advancing mechanism 2. The exact position of the record card 40 is not known prior to its contact with the hook ends of the flexible members 44 because the card advancing mechanism 2 is in constant motion during the introduction of the record card 40 by the feed rolls 42 and because of the possible movement of the record card in the assembly 3 due to the motion of mechanism 2. The flexible members 44 will set the record card 40 somewhere on the trailing edge 10*a* of tooth 8*a* and the position of the record card for advancing will be corrected in a following movement of the assembly 3. Since the trailing edge of the record card 40 is no longer supported by the top of a tooth, the spring member 12*a* is able to hold the trailing edge of the record card 40 against the sloping trailing surface 10*a* of tooth 8*a*. Just after the card advancing mechanism 2 starts its leftward travel, the trailing edge of the record card 40 comes into contact with and is held against the edge 9 of the sawtooth plate and against the trailing surface 10*a* of tooth 8*a*. This is a second correcting action of the device. Sometime during the initial movement of the assembly 3 the trailing edge of the record card 40 will contact edge 9 and thus correct for the positioning of the record card on slope 10*a* of tooth 8*a*. This position of the record card 40 with respect to the card advancing mechanism 2** is shown in FIGURE 2 and represents their positions prior to the first record card advancement.

Figure 3:
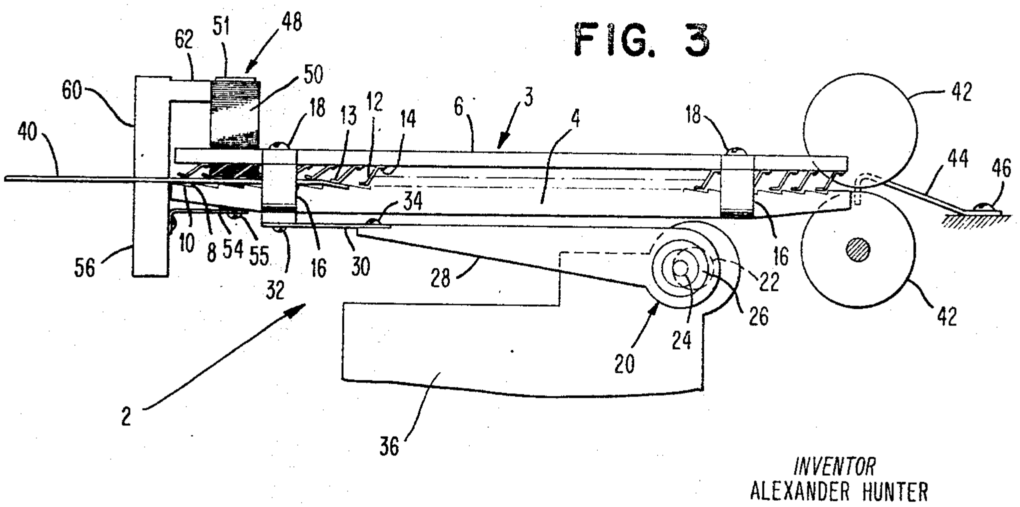
FIGURE 3 shows the record card within the card advancing mechanism with the card advancing mechanism in a position closest to the punch station.
Figure 5:
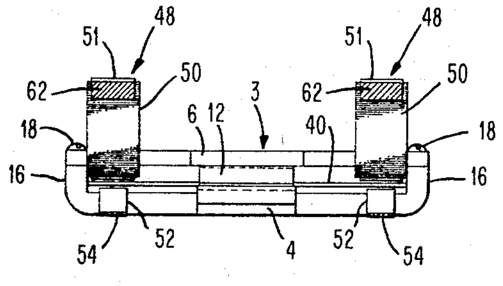
FIGURE 5 is a sectional view of the card advance mechanism taken along the line 5—5 of FIGURE 4.

As the card advancing mechanism 2 moves to the left, it advances the record card 40 towards the punch station 57 (to be described in greater detail below) by virtue of the contact between the trailing edge of the card and the leading edge of the tooth 8. The amount of travel of the card to the left will be determined by the amount of movement imparted to the card advancing mechanism 2 by the eccentric assembly 20. The number of record card columns advanced will depend both on the movement imparted by the eccentric assembly 20 and the spacing between the vertical leading edges of adjacent teeth 8. The number of record card columns advanced will be so chosen that the next column or group of columns to be punched will be advanced into the punch station 57. For example, should the punch station 57 be capable of punching but a single column in one punch operation then the amount of record card advance will be limited to one record card column similarly, if two columns may be simultaneously punched then card advance will be limited to two record card columns. The relative position of the card advancing mechanism 2, at the end of its travel to the left, with respect to punch station 57 is shown in FIGURE 3. The record card 40 is shown in engagement with a tooth 8 near the left end of the sawtooth plate 4 and in such a position would present columns in the latter portion of the record card 40 for punching. It is not intended that FIGURE 3 represent the position of the record card 4 and the card advancing mechanism 2 at the end of the first card advancing step.

The punching station 57, as shown in FIGURE 3 and mentioned above consists of a punch guide 60, mounted above the record card passage, which contains a plurality of punch bars (not shown) and a punch die 56, mounted below the record card passage. Punching takes place as soon as record card advancement has terminated. The punch mechanism may take the form of devices well known in the art, in that the specific details of the punch mechanism form no part of the instant invention. An example of punch mechanism for punching a single row or column (depending upon the dimension along which the record card is fed) is the application of R. E. Seymour, for a United States patent, Serial Number 313,370, filed Oct. 3, 1963, now Patent No. 3,187,999 and entitled Card Punching Device. An example of the two column or row type punching mechanism is described in the R. E. Seymour et al. application for a United States patent, Serial Number 318,257, filed October 23, 1963, now Patent No. 3,189,270 and entitled Card Punching Device. Both of these applications are assigned to the assignee of the instant application. The record card after it has been completely punched, as desired, will be transported by further feed rolls (not shown) to a stacker (also not shown).

As has been briefly described above, after the record card has been advanced the first time to place the first columns in the punch station 57 and while punching takes place, the card advancing mechanism 2 must be moved with respect to the record card 40 in order that the trailing edge thereof engage the leading edge of the next tooth in the direction of the desired record card movement. This relative movement is caused by the operation of the card restraining means 48 which will now be described with reference to FIGURES 1, 4 and 5. The card restraining means 48 consists of a pair of coils 50 each wound about a central core 51 and supported by means of a mounting ear 62 of the punch guide 60 (see FIGURE 1). The coils 50 are mounted above the record card passage and arranged on either side of the card advancing mechanism 2 as shown in FIGURE 4. The coils, when activated by means of the control means 64 (see FIGURE 1) cause the armatures 52 mounted below the record card passage to be drawn towards the cores 51 of the coils 50. The armatures 52 are supported and positioned by means of flexible spring members 54 which hold the armatures 52 normally out of contact with the cores 51. The armatures 52 are fastened to the flexible spring members 54 by the fasteners 55 and to the punch die 56 by the fasteners 58 (see FIG. 1). After the completion of the leftward movement of the card advancing mechanism (during which the record card 40 is advanced) and before the start of the rightward motion of the card advancing mechanism 2 (during which motion the card advancing mechanism 2 is to be repositioned with respect to the record card 40) the control means 62 coupled to the coils 50 is operated by means not shown to supply operating current to the coils 50. The armatures 52 are drawn toward the cores 51 of the coils 50. The armatures 52 press the record card toward and into contact with the cores 51 of the coils 50 and act to hold the record card 40 in this position during the following motion of the sawtooth plate 4 to the right. Due to the amount of travel of the card advancing mechanism 2 and the spacing between consecutive teeth, as set out above, the trailing edge of the record card 40 will be adjacent the leading edge of the next tooth 8 in the direction of record card motion. The associated spring member 12 will hold the record card 40 against the trailing edge of the tooth next adjacent the desired tooth in preparation for further card advancement. Prior to the start of leftward movement of the card advancing mechanism, the control means 62 is operated to terminate the current supplied to the coils 50 and release the restraining means 48. The armatures 52 are drawn by the spring means 54 to positions out of engagement with the record card 40 (see FIG. 5) and the record card 40 may again be advanced without hindrance.

Thus by carefully controlling the machining of each of the respective teeth of the sawtooth plate 4 and by accurately controlling the amount of movement of the card advancing mechanism 2 provided by the eccentric device 20, accurate movement of the record card 40 may be controlled through the card advancing mechanism 2. Each step is accurately controlled and accurate, and minimizes the possibility of cumulative error due to initial positioning errors and errors due to wear, misalignment and misadjustment commonly found in prior art devices.

While the particular form of the device has been shown and described, it is not intended to limit the scope of the invention to the particular form disclosed herein in that any alternative forms of the device will immediately be evident to those skilled in the art.

The embodiments of the invention in which an exclusive property or privilege is claimed are defined as follows:

1. In a record card handling apparatus, means for advancing a record card in a step-by-step manner to a succession of equally spaced positions comprising: a sawtooth plate having a plurality of equally spaced teeth disposed along a surface thereof, each tooth having a first and second surface; a spring plate having a plurality of equal spaced spring members disposed along a surface thereof, said spring members corresponding in number to said teeth; connecting means connecting said sawtooth plate to said spring plate whereby each spring member is disposed adjacent the second surface of a tooth of said sawtooth plate; feeding means for inserting record cards between said teeth and said spring members in a position to cause the trailing edge of said record card to contact the first surface of one of said teeth and be held in such a position by the associated one of said spring members; drive means coupled to said plates to alternately move said plates in first and second opposite directions; selectively operable restraining means disposed adjacent said plates and said record card and operable to engage said record card thereby preventing movement of said record card when operated; and control means coupled to said restraining means to selectively operate said restraining means whereby said record card is moved with said plates to advance said record card when said plates are moving in a first direction and to permit relative motion between said plates and said record card when said plates are moving in a second direction to place said record card in contact with the tooth adjacent to said one tooth and in the direction of record card advance.

2. The advancing means as defined in claim 1 wherein said first tooth surface is substantially vertical and said second tooth surface is at such an angle with respect to said first tooth surface that the internal angle formed by said first and second surfaces is acute.

3. The advancing means as defined in claim 1 further including feed means for initially placing said record card in contact with said record card engaging means; and control means placed intermediate said record card engaging means and said feed means for preventing said record card from being moved in a direction opposite to the direction of desired record card advance.

4. In a record card handling apparatus including a feed path over which record cards are to be advanced and an operating station along said feed path adapted to treat a predetermined number of lines of said record card per operation, a mechanism for the step-by-step advancing of a record card through said operating station to present said predetermined number of lines to said operating station for each step advance, comprising: a sawtooth plate having a plurality of equally spaced teeth disposed along a surface thereof, each tooth having a first and second surface, said teeth being spaced from each other by a distance equal to the distance occupied by said predetermined number of lines; a spring plate having a plurality of equally spaced spring members disposed along a surface thereof, said spring members corresponding in number to said teeth of said sawtooth plate; connecting means connecting said sawtooth plate to said spring plate whereby each spring member is disposed adjacent the trailing edge of a tooth of said sawtooth plate; feeding means for inserting record cards between said teeth and said spring members, said record card taking a position with its trailing edge in contact with said first surface of one of said teeth and held in position by the associated one of said spring members; drive means coupled to said plates to alternately move said plates in said first and second opposite directions a distance equal to the distance occupied by said predetermined number of lines; selectively operable restraining means disposed adjacent said plates and said record card and operable to engage said record card thereby preventing movement of said record card when operated and first control means coupled to said restraining means to selectively operate said restraining means whereby said record card is moved with said plates to advance said record card when said plates are moving in a first direction and to permit relative motion between said plates and said record card when said plates are moving in a second direction to place said record card in contact with the tooth of said sawtooth plate adjacent to said one tooth and in a direction of record card advance.

5. The mechanism as defined in claim 4 further including second control means placed intermediate said mechanism for step-by-step advancing of a record card and said feeding means for preventing said record card from being moved in a direction opposite to the direction of desired record card advance.

References Cited by the Examiner

UNITED STATES PATENTS

| | | | |
|---|---|---|---|
| 1,650,076 | 11/1927 | Laencher | 271—54 |
| 2,409,631 | 10/1946 | Jones | 271—54 X |

ROBERT B. REEVES, *Primary Examiner.*

STANLEY H. TOLLBERG, *Examiner.*